United States Patent
Detig-Karlou et al.

(10) Patent No.: US 6,977,289 B2
(45) Date of Patent: Dec. 20, 2005

(54) REACTIVE SYSTEMS THAT HARDEN AT ROOM TEMPERATURE

(75) Inventors: Kamelia Detig-Karlou, Pullach (DE); Joachim Simon, Düsseldorf (DE); Malte Homann, Odenthal (DE); Thomas Stingl, Montabaur (DE); Jörg Tillack, Bergisch Gladbach (DE)

(73) Assignee: Bayer Aktiengesellschaft, Leverkusen (DE)

(*) Notice: Subject to any disclaimer, the term of this patent is extended or adjusted under 35 U.S.C. 154(b) by 24 days.

(21) Appl. No.: 10/705,503

(22) Filed: Nov. 10, 2003

(65) Prior Publication Data

US 2004/0143084 A1 Jul. 22, 2004

(30) Foreign Application Priority Data

Nov. 15, 2002 (DE) .......................... 102 54 376

(51) Int. Cl.$^7$ .............................. C08G 18/80
(52) U.S. Cl. .............. 528/45; 528/60; 528/61; 525/123
(58) Field of Search .............. 528/45, 60, 61; 525/123

(56) References Cited

U.S. PATENT DOCUMENTS

| | | | |
|---|---|---|---|
| 3,931,116 A | 1/1976 | Bernstein et al. | 260/77.5 R |
| 3,993,708 A | 11/1976 | Brinkmann et al. | 260/830 P |
| 4,279,962 A | 7/1981 | Meyer et al. | 428/332 |
| 5,158,922 A | 10/1992 | Hinney et al. | 502/175 |
| 5,219,975 A | 6/1993 | Schmalstieg et al. | 528/45 |
| 5,470,813 A | 11/1995 | Le-Khac | 502/175 |
| 5,589,431 A | 12/1996 | Le-Khac | 502/175 |
| 5,696,221 A | 12/1997 | Barksby et al. | 528/64 |
| 5,731,407 A | 3/1998 | Le-Khac | 528/409 |
| 6,060,574 A | 5/2000 | Schmalstieg et al. | 528/45 |

FOREIGN PATENT DOCUMENTS

| | | |
|---|---|---|
| CA | 1 219 986 | 3/1987 |
| EP | 0 082 983 | 2/1987 |
| EP | 0 293 110 | 11/1988 |
| GB | 1 399 257 | 7/1975 |

OTHER PUBLICATIONS

Applying Inovations to Applications; ARCO Chemical Product Bulletin; 1997.*

ASTM D2849-69, Reapproved 1980, pp. 608-628, "Standard Methods of Testing Urethane Foam Polyol Raw Materials".

Ullmann's Encyklopädie der technischen Chemie, 4$^{th}$ Edition, vol. 12, (month unavailable) 1976, pp. 539-545, Willem Barendrecht et al, "Harze, synthetische".

Kirk-Othmer, Encyclopedia of Chemical Technology, 3$^{rd}$ Edition, vol. 12, (month unavailable) 1980, pp. 852-869, "Hydrocarbon Resins".

Encyclopedia of Polymer Science and Engineering, vol. 7, (month unavailable) 1987, pp. 758 to 782, "Hydrocarbon Resins".

* cited by examiner

Primary Examiner—Rachel Gorr
(74) Attorney, Agent, or Firm—Joseph C. Gil

(57) ABSTRACT

The invention relates to new blocked polyurethane prepolymers, a process for their production and reactive systems produced therefrom that harden at room temperature, and their use.

13 Claims, No Drawings

REACTIVE SYSTEMS THAT HARDEN AT ROOM TEMPERATURE

CROSS REFERENCE TO RELATED PATENT APPLICATION

The present patent application claims the right of priority under 35 U.S.C. § 119 (a)–(d) of German Patent Application No.10254376.3, filed Nov. 15, 2002.

FIELD OF THE INVENTION

The present invention relates to new blocked polyurethane prepolymers, a process for their production, and reactive systems produced therefrom that harden at room temperature and their use.

BACKGROUND OF THE INVENTION

The polyamine/epoxide resin systems known in the prior art are characterised for example by excellent adhesion to metals, very good resistance to chemicals and outstanding anticorrosive properties. With solvent-containing formulations and powder coating systems crosslinked films of high flexibility can be obtained by the use of epoxide resins of high molecular weights and/or polyaminoamides, for example based on dimeric fatty acids as hardeners. Coatings based on solvent-free liquid resins and solvent-free amine hardeners are very brittle on account of the low molecular weights of the epoxide resins and the resulting high network density. Tar substitutes such as coumarone resins for example are therefore used for plasticisation purposes in solvent-free formulations. Especially when using relatively large amounts of hydrocarbon resins such coatings however tend to undergo long-term embrittlement as a result of migration of the non-functional constituents.

A good and permanent elasticisation of the epoxide resins can be achieved by combination with polyurethanes. Thus, high molecular weight, amine-terminated polyether urethane ureas have been produced by reaction of prepolymers containing free isocyanate groups with amines in highly dilute solutions and then hardened with epoxide resins, as described for example in DE-A 23 38 256. The use of the solvents, in particular aromatic solvents, necessary for this purpose is however disadvantageous in practice both for technical as well as physiological reasons. On the other hand the viscosity of the solvent-free reaction products, such as have been specifically produced according to DE-A 23 38 256, is too high for practical applications.

A process for the production of elasticised moulded parts and sheet materials is described in DE-A 24 18 041, in which epoxide compounds are reacted with amine compounds that are obtained by hydrolysis of prepolymeric ketimines or enamines. Chemically resistant and thermally adhering thermosetting materials having improved properties can be produced by this process. The disadvantage of the described process is the high process technology expenditure.

DE-A 21 52 606 describes reactive systems based on alkylphenyl-blocked polyisocyanates and polyamines, which optionally may also be hardened in combination with epoxide resins. These reactive systems too have some disadvantages as regards application technology, for example the reactive systems have a relatively high viscosity and the blocking agent that is released is of comparatively low molecular weight, which means that over time it migrates from the coating and the adhesion of the coating to the substrate is no longer sufficient.

In order to allow a targeted reaction of polyisocyanate prepolymers with excess amounts of diamines it has previously been proposed many times to use polyisocyanates in block form as described for example in CA-A 1 219 986, EP-A 293 110 or EP-A 082 983. There, phenols or substituted phenols are used as preferred blocking agents. After reaction with the polyamines, these substances however cannot be removed or can be removed only incompletely from the reaction mixture on account of their high melting points. The possibly substituted phenols remaining in the mixtures or in the plastics composition then lead however to the already described disadvantages.

In EP-A 0 457 089 on the other hand secondary amines preferably having low boiling points are used as blocking agent. If these amines remain in the reaction mixture after the deblocking, this readily produces an objectionable odour. Although the secondary amine after use in epoxide systems may in principle be incorporated into the system, this reaction however proceeds relatively slowly especially at low temperatures (e.g. room temperature), as a result of which part of the amines leaves the coating. In a particularly preferred use the amine blocking agent is distilled from the reaction mixture after the deblocking. Although this procedure does yield products without an objectionable odour, it is however extremely complicated and thus costly.

From U.S. Pat. No. 6,060,574 reactive compositions are furthermore known that consist of reversibly blocked organic polyisocyanates and at least one polyamine having at least two primary amino groups and that optionally in addition also contain compounds containing oxirane groups. Hydrocarbon resins with phenolic OH groups are used as blocking agent for the organic polyisocyanates. Such blocked polyisocyanates are characterised by a significantly reduced reactivity to polyamines, compared with alkylphenol-blocked polyisocyanates. Prepolymers that are obtained by reacting polyhydroxy compounds with an excess of diisocyanates or polyisocyanates may be used as organic polyisocyanates. Polyether polyols that are obtainable by alkoxylation of suitable starter molecules (for example monomeric polyols) may for example be used as polyhydroxy compounds. The described polyether polyols frequently have the disadvantage however that, due to the production process, the products are basic or acidic (start of the alkoxylation for example with KOH, followed by addition of acid). This can have a disadvantageous effect on the aforedescribed reactive systems and may for example significantly reduce the storage stability. Furthermore the polyether polyols started with bases generally contain a large amount of unsaturated terminal groups and have a broad molecular weight distribution. The unsaturated terminal groups that are formed by the base-catalysed isomerisation of propylene oxide to allyl alcohol cause chain termination and a reduction of the OH functionality. The reduced OH functionality due to the unsaturated terminal groups is a serious disadvantage both for the mechanical properties as well as the compatibility in the reactive systems.

The object of the present invention was accordingly to provide new blocked polyurethane prepolymers that can be processed without any problem to form reactive systems that are solvent-free and harden at room temperature. The coatings produced from these reactive systems should have a good adhesion, in particular wet adhesion, resistance to chemicals, resistance to impact and shock, combined at the same time with flexibility and elasticity. In this connection the blocked polyurethane prepolymers should be particularly highly compatible with the other constituents of the reactive system.

SUMMARY OF THE INVENTION

The present invention is directed to a process for producing blocked polyurethane prepolymers by reacting one or more diisocyanates or polyisocyanates with one or more polyether polyols that have a content of unsaturated terminal groups of less than or equal to 0.02 meq/g of polyol, a polydispersity (PD=$M_w/M_n$) of 1.01 to 1.5, and/or an OH functionality of greater than or equal to 1.9. The reaction forms an NCO-functional polyurethane prepolymer. The NCO groups of the reaction product are then blocked with at least one hydrocarbon resin containing phenolic OH groups and/or an optionally substituted phenol.

The invention if also directed to blocked polyurethane prepolymers obtained using the above-described process.

Additionally, the invention is directed to reactive systems that include:

A) the blocked polyurethane prepolymers described above,

B) at least one organic amine containing at least two primary amino groups,

C) optionally compounds containing oxirane groups that on average contain more than one oxirane group per molecule, and D) optionally catalysts and/or additives.

The invention is further directed to a method of making adhesives, sealing compositions, casting compositions, composites (fibre composite materials), moulded parts and coatings including the step of mixing the above-described blocked polyurethane prepolymers into a solvent free reactive system.

The present invention is still further directed to a method of making anti-corrosive coatings for use in chalybeate water construction, ship building and for pipelines including the step of mixing the above-described blocked polyurethane prepolymers into a solvent free reactive system.

DETAILED DESCRIPTION OF THE INVENTION

Other than in the operating examples, or where otherwise indicated, all numbers or expressions referring to quantities of ingredients, reaction conditions, etc. used in the specification and claims are to be understood as modified in all instances by the term "about."

It has now been found that in particular blocked polyurethane prepolymers based on special polyether polyols produced by means of DMC catalysis can be processed particularly well to form reactive systems that contain polyamines and optionally compounds containing oxirane groups.

The present invention accordingly provides a process for the production of blocked polyurethane prepolymers by reacting a) one or more diisocyanates or polyisocyanates with b) one or more polyether polyols that have a content of unsaturated terminal groups of less than or equal to 0.02 milliequivalent per gramme of polyol (determination method according to ASTM D2849-69), a polydispersity (PD=$M_w/M_n$) of 1.01 to 1.5, and/or an OH functionality of greater than or equal to 1.9, to form an NCO-functional polyurethane prepolymer, followed by blocking of the NCO groups with c) at least one hydrocarbon resin containing phenolic OH groups and/or an optionally substituted phenol.

The present invention also provides blocked polyurethane prepolymers obtainable by the process according to the invention.

The present invention furthermore provides reactive systems containing

A) the polyurethane prepolymers according to the invention,

B) at least one organic amine containing at least two primary amino groups,

C) optionally compounds containing oxirane groups that on average contain more than one oxirane group per molecule, as well as D) optionally catalysts and/or additives.

The present invention also provides for the use of the polyurethane prepolymers according to the invention for the production of adhesives, sealing compositions, casting compositions, composites (fibre composite materials), moulded parts and coatings. Possible areas of application include in particular anticorrosive coatings in chalybeate water construction, ship building (e.g. ballast tanks) and for pipelines as well as floor coatings.

Suitable diisocyanates and polyisocyanates (a) are aliphatic, cycloaliphatic, aromatic or heterocyclic organic diisocyanates and polyisocyanates with at least two isocyanate groups as well as mixtures thereof. Examples of suitable aliphatic isocyanates are diisocyanates and triisocyanates such as for example butane diisocyanate, pentane diisocyanate, hexane diisocyanate (hexamethylene diisocyanate, HDI), 4-isocyanatomethyl-1,8-octane diisocyanate (triisocyanatononane, TIN) or cyclic systems such as for example 4,4'-methylenebis(cyclohexylisocyanate) (Desmodur® W, Bayer AG, Leverkusen), 3,5,5-trimethyl-1-isocyanato-3-isocyanatomethylcyclohexane (isophorone diisocyanate, IPDI) as well as ω,ω'-diisocyanato-1,3-dimethylcyclohexane ($H_6$XDI). Particularly suitable are aromatic polyisocyanates such as for example 1,5-naphthalene diisocyanate, diisocyanatodiphenylmethane (MDI) or crude MDI, diisocyanatomethyl-benzene (2,4- and 2,6-toluylene isocyanate, TDI), in particular the 2,4- and 2,6-isomers, and technical mixtures of the two isomers as well as 1,3-bis (isocyanatomethyl)-benzene (XDI).

A most particularly preferred aromatic diisocyanate is 2,4-toluylene diisocyanate as well as its technical mixture of 70 to 90% of 2,4-toluylene diisocyanate and 30 to 10% of 2,6-toluylene diisocyanate.

Also suitable within the context of the invention are the secondary products known per se of the aforementioned isocyanates with a biuret isocyanurate, iminooxadiazindione, uretdione, allophanate and/or urethane structure.

Suitable polyether polyols (b) are polyether polyols in the molecular weight range from 300 to 20,000, in some cases 1000 to 12,000, and in other cases 2000 to 6000, with a content of unsaturated terminal groups of less than or equal to 0.02 milli-equivalent per gramme of polyol, in some cases less than or equal to 0.015 milli-equivialent per gramme of polyol, and in other cases less than or equal to 0.01 milli-equivalent per gramme of polyol (determination method according to ASTM D2849-69). The polyether polyols have a particularly narrow molecular weight distribution, i.e. a polydispersity (PD=$M_w/M_n$) of 1.01 to 1.5 and/or an OH functionality $\geq$1.9. In some cases the aforementioned polyether polyols have a polydispersity of 1.1 to 1.5 and an OH functionality of greater than 1.9, and in other cases greater than or equal to 1.95.

Individual suitable polyether polyols are listed by way of example in Table 1:

TABLE 1

| | Acclaim ® 1000 | Acclaim ® 2200 | Acclaim ® 3201 | Acclaim ® 4200 | Acclaim ® 6300 | Acclaim ® 8200 | Acclaim ® 12200 |
|---|---|---|---|---|---|---|---|
| Physical Data | | | | | | | |
| Molecular weight | 1000 | 2000 | 3000 | 4000 | 6000 | 8000 | 12000 |
| Functionality | 2 | 2 | 2 | 2 | 3 | 2 | 2 |
| Viscosity (25° C.) | 70 | 335 | 620 | 980 | 1470 | 3000 | 5950 |
| Chemical Data | | | | | | | |
| OH No. (mg KOH/g) | 112 | 56 | 37 | 28 | 28 | 14 | 10 |
| Double bond content (meq/g) | ≦0.0070 | ≦0.0070 | ≦0.0070 | ≦0.0070 | ≦0.0070 | ≦0.0070 | ≦0.0070 |
| Acid No. (mg KOH/g) | 0.02 | 0.02 | 0.018 | 0.018 | 0.02 | 0.02 | 0.02 |

All Acclaim ® products are obtainable from Bayer AG, Leverkusen, Germany.

The polyether polyols with a content of unsaturated terminal groups of less than or equal to 0.02 milliequivalent and a particularly narrow molecular weight distribution, i.e. a polydispersity of 1.01 to 1.5 and/or an OH functionality of ≧1.9, can be prepared in a manner known per se by alkoxylation of suitable starter molecules, in particular with the use of double metal cyanide catalysts (DMC catalysis). This is described for example in US-A 5158 922 (e.g. Example 30) and in EP-A 0 654 302 (p. 5, line 26 to p. 6, line 32).

Suitable starter molecules for the production of the polyether polyols are for example simple, low molecular weight polyols, water, organic polyamines with at least two N—H bonds or arbitrary mixtures of such starter molecules. Suitable alkylene oxides for the alkoxylation are in particular ethylene oxide and/or propylene oxide, which may be used in an arbitrary sequence or also as a mixture in the alkosylation.

Preferred starter molecules for the production of the polyether polyols by alkoxylation, especially according to the DMC process, are in particular simple polyols such as ethylene glycol, propylene glycol-1,3 and butanediol-1,4, hexanediol-1,6, neopentyl glycol, 2-ethylhexanediol-1,3, glycerol, trimethylol-propane, pentaerythritol as well as low molecular weight, hydroxyl group-containing esters of such polyols with dicarboxylic acids of the type mentioned hereinafter by way of example, or low molecular weight ethoxylation or propoxylation products of such simple polyols or arbitrary mixtures of such modified or unmodified alcohols.

Suitable blocking agents c) are hydrocarbon resins containing at least one phenolic OH group and/or optionally substituted phenols. Preferred blocking agents c) are hydrocarbon resins containing phenolic OH groups.

Suitable optionally substituted phenols of the component c) are, in particular, $C_1$–$C_{18}$-alkyl phenols, and more particularly $C_6$–$C_{12}$-alkyl phenols, wherein the alkyl radical can be linear, branched or cyclic. Isomer mixtures of various alkyl phenols can of course also be used. Examples are phenol, cresol and its isomers, xylenol and its isomers, 2-tert.-butyl phenol, 4-tert.-butylphenol, nonylphenol and its optionally branched isomers (technical isononyl phenol). Other examples of substituted phenols are hydroxybenzoic acid alkyl esters in which the ester group is preferably a $C_1$–$C_4$-alkyl radical. Mixtures of the aforementioned alkyl phenols and hydroxybenzoic acid alkyl esters can of course also be used.

Phenolic hydrocarbon resins (c) containing OH groups that are used for the blocking of the isocyanate group-containing polyurethane prepolymers are known in principle and are described for example in Ullmann's Encyklopädie der technischen Chemie, $4^{th}$ Edition, Vol. 12, pp. 539 to 545 (Verlag Chemie, Weinheim 1976), Kirk-Othmer, Encyclopedia of Chemical Technology, $3^{rd}$ Edition, Vol. 12, pp. 852 to 869, (John Wiley & Sons, New York 1980) or Encyclopedia of Polymer Science and Engineering, Vol. 7, pp. 758 to 782 (John Wiley & Sons, New York 1987). Examples of suitable hydrocarbon resins (c) containing phenolic OH groups are coumarone-indene resins, petroleum resins or terpene resins.

Such hydrocarbon resins containing phenolic OH groups are typically produced by copolymerisation of unsaturated hydrocarbons of the aforementioned type with phenol and/or alkylated phenols such as cresols in the presence of strong acids or catalysts of the Friedel-Crafts type. Suitable unsaturated hydrocarbons for the production of the OH-functional hydrocarbon resins that may be used according to the invention are those hydrocarbons obtained in the cracking of naphtha or gas oil, such as for example butene, butadiene, pentene, piperylene, isoprene, cyclopentadiene, styrene, α-methylstyrene, vinyltoluene, dicyclopentadiene, methyldicyclopentadiene, indene or methylindene. Also suitable as unsaturated hydrocarbons are terpene resins such as for example α-pinene, β-pinene, dipentene, D-limonene or terpentine.

The suitable hydrocarbon resins have an hydroxyl group content of 0.1 to 10.0 wt. % and in some cases an hydroxyl group content of 0.9 to 9 wt. %. In particular cases the hydrocarbon resins are liquid at room temperature that have an hydroxyl group content of 2 to 8 wt. %, and in certain cases 3 to 5 wt. %.

The production of the isocyanate group-containing polyurethane prepolymers is carried out by reacting the polyether polyols (b) with excess amounts of the diisocyanates or polyisocyanates (a) or also with a large excess of the aforementioned diisocyanates or polyisocyanates, followed by removal of the excess polyisocyanate, for example by thin-layer distillation. The molar ratio of the OH groups of the polyether polyol to the NCO groups of the diisocyanate or polyisocyanate can be between 1:1.5 and 1:20, in some cases between 1:1.8 and 1:5, and in other cases between 1:1.95 and 1:2.05. The preparation of the polyurethane prepolymers is generally carried out at 20° C. to 140° C., in some cases at 40° C. to 100° C., optionally with the use of catalysts known per se from polyurethane chemistry, such as for example organometallic compounds such as tin(II) octoate, dibutyltin(II) diacetate, dibutyltin(II) dilaurate or tertiary amines such as triethylamine or diazabicyclooctane. If desired, the polyurethane prepolymers can be produced in an inert solvent, but the production without using a solvent is preferred.

The production of the blocked polyurethane prepolymers according to the invention is carried out by reacting the isocyanate group-containing polyurethane prepolymers with the hydrocarbons resins containing phenolic OH groups and/or with optionally substituted phenols (c) at temperatures of 40° C. to 150° C., in some cases at 50° C. to 100° C., and in other cases at 60° C. to 90° C.

The amount of the component (c) used in the blocking reaction should correspond at least to 30 mole %, in some cases 50 mole % and in other cases to more than 95 mole % of the amount of the isocyanate groups to be blocked. A slight excess of blocking agent may be expedient in order to ensure a complete reaction of all isocyanate groups. As a rule the excess does not amount to more than 20 mole %, in some cases not more than 15 mole % and in other cases not more than 10 mole % referred to the isocyanate groups to be blocked. The amount of the component (c) used in the blocking reaction is therefore often times 95 mole % to 110 mole %, referred to the amount of the isocyanate groups of the polyurethane prepolymer that are to be blocked.

The blocking reaction is preferably carried out with the co-use of catalysts known per se from polyurethane chemistry, such as for example organometallic compounds such as tin(II) octoate, dibutyltin(II) diacetate, dibutyltin(II) laurate, 2,3-dimethyl-3,4,5,6-tetrahydropyrimidine or tertiary amines such as triethylarnine or diazabicyclooctane or 1,8-diazabicyclo[5.4.0]undec-7-ene. The blocking reaction may optionally be carried out in the presence of inert solvents or lacquer solvents such as for example ethyl acetate, butyl acetate, methoxypropyl acetate, methyl ethyl ketone, methyl isobutyl ketone, toluene, xylene, aromatic or (cyclo)aliphatic hydrocarbon mixtures or arbitrary mixtures of such solvents. These solvents or lacquer solvents must then be removed following the synthesis, for example by distillation, in order to obtain solvent-free reactive systems.

However, the reactions according to the invention are preferably carried out in a solvent-free manner.

The addition of the components may take place in any desired order both in the production of the isocyanate group-containing prepolymers as well as in the blocking of the latter. It is preferred however to add the polyisocyanate to the initially introduced polyether polyol (b) and finally to add the blocking component (c). For this purpose the polyether polyol (b) is added to a suitable reaction vessel and heated to 40° C. to 100° C., optionally while stirring. After the desired temperature is reached the diisocyanate or polyisocyanate (a) is then added while stirring and stirring is continued until the theoretical NCO content of the polyurethane prepolymer expected according to the chosen stoichiometry or a value slightly less than this is reached. In order to accelerate the blocking reaction a suitable catalyst, such as for example dibutyltin(II) dilaurate is then added, the temperature of the reaction mixture optionally being adjusted to a value between 50° C. and 100° C. before or after the addition of the catalyst. After the desired temperature is reached the blocking agent (c) is now added and the reaction mixture is heated until the content of free isocyanate groups is less than 0.5 wt. %, in some cases less than 0.2 wt. %, and in other cases less than 0.1 wt. %. The reaction mixture is then cooled and a reaction terminator, such as for example benzoyl chloride, is optionally also added.

In a further embodiment of the process according to the invention the diisocyanate or polyisocyanate (a) is added to a suitable reaction vessel and heated to 40° C. to 100° C., optionally while stirring. After the desired temperature is reached the polyether polyol (a) is then added while stirring and the mixture is stirred further until the theoretical NCO content of the polyurethane prepolymer expected according to the desired stoichiometry or a value slightly below this is reached. The further reaction then takes place as already described.

Suitable components (B) for the production of a reactive system containing the blocked polyurethane prepolymers according to the invention are polyamines that contain at least two primary amino groups per molecule and optionally also secondary amino groups and that preferably have a mean molecular weight of 60 to 500. The following are for example suitable: ethylenediamine, 1,2- and 1,3-diaminopropane, 1,4-diaminobutane, 2,2,4- and/or 2,4,4-trimethylhexamethylenediamine, the isomeric xylylenediamines, 1,2- and 1,4-diaminocyclohexane, 4,4'-diaminodicyclohexylmethane, 1,3-diaminocyclopentane, 4,4'-diaminodicyclo-hexylsulfone, 4,4'-diaminodicyclohexylpropane-1,3,4,4'-diaminodicyclohexyl-propane,-2,2,3,3'-dimethyl-4,4'-diaminodicyclohexylmethane, 3-aminomethyl-3,3,5-trimethylcyclohexylamine (isophorone diamine), 3(4)-aminomethyl-1-methylcyclohexylamine or technical bisaminomethyltricyclodecane, or also those polymers that contain in addition to at least two primary amino groups, also secondary amino groups, such as for example diethylenetriamine or triethylenetetramine.

Polyamines, in particular diamines of the aforementioned molecular weight range that contain one or more cycloaliphatic rings, are preferably used. These include for example 1,2- and 1,4-diaminocyclohexane, 4,4'-diaminodicyclohexylmethane, 1,3-diaminocyclopentane, 4,4'-diaminodicyclohexylsulfone, 4,4'-diaminodicyclohexyl-propane,-1,3,4,4'-diaminodicyclohexylpropane-2,2,3,3'-dimethyl-4,4'-diaminodicyclo-hexylmethane, 3-aminomethyl-3,3,5-trimethylcyclo-hexylamine (isophorone diamine), 3(4)-aminomethyl-1-methylcyclohexylamine or technical bisaminomethyltri-cyclododecane.

There may also be used as component (B) adducts that are produced by reacting an excess of the aforementioned polyamines with epoxide resins of the type mentioned hereinafter.

There may furthermore be used as component (B) polyether amines that are produced by reacting polyether polyols with ammonia and that are marketed for example by Huntsman, USA under the trade name "Jeffamin®".

Moreover, polyamide resins are also suitable as component (B). Such polyamide resins, which include polyaminoamides and polyaminoimidazolines, are marketed for example by Henkel KGaA under the trade name "Versamid®".

It is obviously also possible to employ mixtures of the aforementioned polyamines as component (B).

Component (C) are compounds containing oxirane groups. Suitable compounds containing oxirane groups are epoxide resins that contain on average more than one epoxide group per molecule. Examples of suitable epoxide resins are glycidyl ethers of polyhydric alcohols such as for example butanediol, hexanediol, glycerol, hydrogenated diphenylolpropane or polyhydric phenols such as for example resorcinol, diphenylolpropane-2,2 (Bisphenol A), diphenylolmethane (bisphenol F) or phenol-aldehyde condensates. Glycidyl esters or polybasic carboxylic acid, such as hexahydrophthalic acid or dimerised fatty acids, may also be used.

It is preferred to use liquid epoxy resins based on epichlorohydrin and diphenylolpropane-2,2 (bisphenol A) or diphenylolmethane (bisphenol F) or their mixtures. If necessary the viscosity of the mixtures may be lowered using monofunctional epoxide compounds, the processing thereby being improved. Examples of such compounds are aliphatic and aromatic glycidyl ethers such as butyl glycidyl ether, phenyl glycidyl ether, or glycidyl esters such as versatic acid glycidyl ester, or epoxides such as styrene oxide or 1,2-epoxidodecane.

In the solvent-free reactive systems that harden at room temperature and contain the blocked polyurethane prepolymers according to the invention, there are generally present 0.4 to 0.9, in some cases 0.5 to 0.8 primary amino groups of the component (B) and 0.02 to 0.6, in some cases 0.03 to 0.5 blocked isocyanate groups of the component (A) per epoxide group of the component (C).

In order to produce ready-for-use mixtures there may be incorporated in the reactive systems, apart from the components A), B) and optionally C), also the conventional auxiliary substances and additives such as for example fillers, solvents, flow improvers, pigments, solvents, reaction accelerators or viscosity regulators. By way of example there may be mentioned reaction accelerators such as salicylic acid, bis(dimethylaminomethyl)phenol or tris(dimethylamino-methyl)phenol, fillers such as sand, powdered stone, silicic acid, asbestos flour, kaolin, talcum, metal powders, tar, tar pitch, asphalts, cork chips, polyamides, plasticisers such as for example phthalic acid esters, or other viscosity regulators such as for example benzyl alcohol.

Obviously there may be added to the ready-for-use mixture optionally up to 20 wt. %, in some cases up to 10 wt. % and in other cases up to 5 wt. % of a solvent or lacquer solvent of the type already described, for application technology purposes. If solvents are employed at this point, then in the event of a possible use of solvents during the production of the polyurethane prepolymers according to the invention the removal of the solvent may also be omitted. However, solvent-free ready-for-use mixtures are preferred.

The solvent-free reactive systems hardening at room temperature and containing the blocked polyurethane prepolymers according to the invention are suitable for the production of coatings, adhesives, sealing compositions, casting compositions or moulded parts for all areas of application where good adhesion, resistance to chemicals as well as high impact and shock strength combined with good flexibility and elasticity are required. The systems according to the invention are particularly suitable as anti-corrosive coatings. The systems are characterised by a good wet adhesion and a good adhesion under cathodic protection conditions, especially when attacked by aggressive media such as for example in ballast tank coatings.

In addition the blocked polyurethane prepolymers according to the invention exhibit an outstanding compatibility with the components B) and C) since the reaction of epoxide resin/amine and blocked isocyanate/resin can be adjusted so that the reactive systems form a compatible blend at room temperature.

EXAMPLES

Preliminary Comment

The polyether polyols used in the examples for the production of the blocked polyurethane prepolymers according to the invention are obtainable from Bayer AG, Leverkusen, Germany, and are characterised by the following characteristic data:

TABLE 2

| | Acclaim ® 1000 | Acclaim ® 2200 | Acclaim ® 3201 | Acclaim ® 4200 |
|---|---|---|---|---|
| Physical Data | | | | |
| Molecular weight | 1000 | 2000 | 3000 | 4000 |
| OH Function-ality | 2 | 2 | 2 | 2 |
| Viscosity (25° C.) | 70 | 335 | 620 | 980 |
| Chemical Data | | | | |
| OH No. (mg KOH/g) | 112 | 56 | 37 | 28 |
| Content of unsaturated terminal groups (meq/g) | ≦0.0070 | ≦0.0070 | ≦0.0070 | ≦0.0070 |
| Acid No. (mg KOH/g) | 0.02 | 0.02 | 0.018 | 0.018 |

Materials employed:

| Trade Name | Chemical Description | Manufacturer |
|---|---|---|
| Novares ® LX 200 | Phenolically modified hydrocarbon liquid resin, co-polymer of unsaturated, aromatic $C_9$-/$C_{10}$-hydrocarbons; OH content: 4% | VFT AG, Duisburg, Germany |
| Novares ® LA 300 | Phenolically modified hydrocarbon liquid resin, co-polymer of unsaturated, aromatic $C_9$-/$C_{10}$-hydrocarbons; OH content: 2% | VFT AG, Duisburg, Germany |
| D.E.R. 358 | Liquid epoxy resin based on bisphenol A and bisphenol F | Dow Plastics, Midland, USA |

TABLE 2-continued

| | | |
|---|---|---|
| Perenol ® E 8 | Additive for degassing and defoaming | Cognis Deutschland GmbH & Co., KG, Dusseldorf, Germany |
| Polypox ® H 031 | Modified cycloaliphatic polyamine | UPPC, Mietingen-Baltringen, Germany |
| Laromin ® C 260 | Bis(4-amino-3-methylcyclohexyl)-methane | BASF AG, Ludwigshafen, Germany |

Comparison Example 1 a) Production of a Blocked Polyurethane Prepolymer Using a Polyether Polyol Produced by Base-catalysed Alkoxylation:

665.28 g of a polyether polyol of OH number 44, produced by base-catalysed, simultaneous ethoxylation and propoxylation (EO/PO ratio=2:8) of a 2:1 mixture of propylene glycol and glycerol, are prepolymerised with 90.79 g of 2,4-diisocyanatotoluene and 0.04 g of 2-chloropropionic acid at 60° C. until the theoretical NCO content of 2.9 wt. % is achieved. 243.93 g of a commercially available hydrocarbon resin with an hydroxyl group content of 4 wt. % (Novares® LX 200) are then added, catalysed with 0.07 g of dibutyltin(II) dilaurate and stirred for 10 hours at 80° C. 0.23 g of benzoyl chloride is next added. After this time free isocyanate can no longer be detected in the IR spectrum. According to NCO titration the NCO content is less than 0.2 wt. %. The blocked isocyanate prepolymer obtained has the following characteristic data:

| | |
|---|---|
| blocked NCO content: | 2.11 wt. % |
| viscosity (23° C.): | 76500 mPa · s | b) Production of a Reactive System:

20 g of the prepolymer from a) are thoroughly stirred with 6.6 g of octahydro-4.7-methanoindene-1.5-dimethanamine, 20 g of D.E.R 358, 0.2 g of 2,3-dimethyl-3,4,5,6-tetrahydropyrimidine, 0.4 g of oleic acid, 0.2 g of Perenol® E 8 and 0.2 g of benzyl alcohol. The mixture is poured out to form a layer 3 mm thick.

After a few hours a turbid and consequently non-homogeneous test body is obtained:

| | |
|---|---|
| ultimate tensile stress: | 20.3 MPa |
| elongation at break: | 32.1% |
| tear propagation resistance: | 24.3 N/mm |

Example 1 a) Production of a Blocked Polyurethane Prepolymer with Acclaim® 2200

605.53 g of the polyether polyol Acclaim® 2200 with an OH number of 56 are prepolymerised with 105.36 g of 2,4-diisocyanatotoluene and 0.04 g of 2-chloropriopionic acid at 60° C. until the theoretical NCO content of 3.58 wt. % is reached. 289.11 g of a commercially available hydrocarbon resin with an hydroxyl group content of 4 wt. % (Novares® LX 200) are then added, catalysed with 0.07 g of dibutyltin(II) dilaurate and stirred for 10 hours at 80° C. 0.15 g of benzoyl chloride is then added. After this time free isocyanate can no longer be detected in the IR spectrum. According to the NCO titration the NCO content is less than 0.2 wt. %. The blocked isocyanate prepolymer obtained has the following characteristic data:

| | |
|---|---|
| blocked NCO content: | 2.54 wt. % |
| viscosity (23° C.): | 63000 mPa · s | b) Production of a Reactive System:

20 g of the prepolymer from a) are thoroughly stirred with 6.74 g of octahydro-4.7-methanoindene-1.5-dimethanamine, 20 g of D.E.R 358, 0.2 g of 2,3-dimethyl-3,4,5,6-tetrahydropyrimidine, 0.4 g of oleic acid, 0.2 g of Perenol® E 8 and 0.2 g of benzyl alcohol. The mixture is poured out to form a layer 3 mm thick. After a few hours a transparent, elastic plastics material having the following chemical characteristic values is obtained:

| | |
|---|---|
| ultimate tensile stress: | 19.1 MPa |
| elongation at break: | 44.2% |
| tear propagation resistance: | 30.6 N/mm |

Compared to comparison example 1, by using the reactive system of the invention according to Example 1 a transparent and consequently homogeneous plastics material is obtained. The plastics material produced in comparison example 1 also has significantly worse mechanical values.

Example 2 a) Production of a Blocked Polyurethane Prepolymer with Acclaim® 2200:

908.29 g of the polyether polyol Acclaim® 2200 with an OH number of 56 are prepolymerised with 158.04 g of 2,4-diisocyanatotoluene and 2,6-diisocyanatotoluene (80:20) at 65° C. until the theoretical NCO content of 3.58 wt. % is reached. 433.66 g of a commercially available hydrocarbon resin with an hydroxyl group content of 4 wt. % (Novares® LX 200) are then added, catalysed with 0.11 g of dibutyltin(II) dilaurate and stirred for 10 hours at 80° C. 0.23 g of benzoyl chloride is then added. After this time free isocyanate can no longer be detected in the IR spectrum. According to the NCO titration the NCO content is equal to 0.2 wt. %. The blocked isocyanate prepolymer obtained has the following characteristic data:

| | |
|---|---|
| blocked NCO content: | 2.45 wt. % |
| viscosity (23° C.): | 73000 mPa · s | b) Production of a Reactive System:

5 g of the prepolymer are thoroughly stirred with 1.53 g of octahydro-4.7-methanoindene-1.5-dimethanamine and D.E.R 358. The mixture is poured out to form a layer 3 mm thick. After a few hours a transparent, elastic plastics material is obtained.

Example 3 a) Production of a Blocked Polyurethane Prepolymer with Acclaim® 2200:

496.57 g of the polyether polyol Acclaim® 2200 with an OH number of 56 are prepolymerised with 86.4 g of 2,4-diisocyanatotoluene 0.04 g of 2-chloropropionic acid at 60° C. until the theoretical NCO content of 3.58 wt. % is achieved. 417.03 g of a commercially available hydrocarbon resin with an hydroxyl group content of 2 wt. % (Novares® LA 300) are then added, catalysed with 0.07 g of dibutyltin (II) dilaurate and stirred for 10 hours at 80° C. 0.15 g of benzoyl chloride is next added. After this time free isocyanate can no longer be detected in the IR spectrum. According to NCO titration the NCO content is less than 0.2 wt. %. The blocked isocyanate prepolymer obtained has the following characteristic data:

| blocked NCO content: | 2.02 wt. % |
|---|---|
| viscosity (23° C.): | 28000 mPa · s | b) Production of a Reactive System:

20 g of the prepolymer from a) are thoroughly stirred with 6.62 g of octahydro-4.7-methanoindene-1.5-dimethanamine, 20 g of D.E.R 358, 0.2 g of 2,3-dimethyl-3,4,5,6-tetrahydropyrimidine, 0.4 g of oleic acid, 0.2 g of Perenol® E 8 and 0.2 g of benzyl alcohol. The mixture is poured out to form a layer 3 mm thick. After a few hours a slightly turbid, elastic plastics material having the following mechanical properties is obtained:

| ultimate tensile stress: | 19.3 MPa |
|---|---|
| elongation at break: | 44.2% |
| tear propagation resistance: | 30.6 N/mm |

Example 4 a) Production of a Blocked Polyurethane Prepolymer with Acclaim® 1000 and Acclaim® 3201:

223.14 g of the polyether polyol Acclaim® 1000 with an OH number of 112 and 74.38 g of the polyether polyol Acclaim® 3201 with an OH number of 37 are prepolymerised with 86.28 g of 2,4-diisocyanatotoluene at 60° C. until the theoretical NCO content of 5.43 wt. % is reached. 416.2 g of a commercially available hydrocarbon resin with an hydroxyl group content of 2 wt. % (Novares® LA 300) are then added, catalysed with 0.06 g of dibutyltin(II) dilaurate and stirred for 10 hours at 80° C. 0.12 g of benzoyl chloride is then added. After this time free isocyanate can no longer be detected in the IR spectrum. According to the NCO titration the NCO content is less than 0.2 wt. %. The blocked isocyanate prepolymer obtained has the following characteristic data:

| blocked NCO content: | 2.35 wt. % |
|---|---|
| viscosity (23° C.): | 87000 mPa · s | b) Production of a Reactive System:

5 g of the prepolymer are thoroughly stirred with 1.66.g of octahydro-4.7-methanoindene-1.5-dimethanamine and 5 g of D.E.R 358. The mixture is poured out to form a layer 3 mm thick. After a few hours a transparent, elastic plastics material with a Shore A hardness of 92 is obtained:

Example 5

Production of a Blocked Polyurethane Prepolymer with Acclaim® 1000 and Acclaim® 4200:

226.67 g of the polyether polyol Acclaim® 1000 with an OH number of 112 and 75.64 g of the polyether polyol Acclaim® 4200 with an OH number of 28 are prepolymerised with 85.46 g of 2,4-diisocyanatotoluene at 60° C. until the theoretical NCO content of 5.32 wt. % is reached. 412.23 g of a commercially available hydrocarbon resin with an hydroxyl group content of 2 wt. % (Novares® LA 300) are then added, catalysed with 0.06 g of dibutyltin(II) dilaurate and stirred for 10 hours at 80° C. 0.12 g of benzoyl chloride is then added. After this time free isocyanate can no longer be detected in the IR spectrum. According to the NCO titration the NCO content is less than 0.2 wt. %. The blocked isocyanate prepolymer obtained has the following characteristic data:

| blocked NCO content: | 2.34 wt. % |
|---|---|
| viscosity (23° C.): | 81000 mPa · s | b) Production of a Reactive System:

5 g of the prepolymer are thoroughly stirred with 1.66 g of octahydro-4.7-methanoindene-1.5-dimethanamine and 5 g of D.E.R 358. The mixture is poured out to form a layer 3 mm thick. After a few hours a transparent, elastic plastics material with a Shore A hardness of 95 is obtained:

Example 6 a) Production of a Blocked Polyurethane Prepolymer with Acclaim® 1000:

330.4 g of the polyether polyol Acclaim® 1000 with an OH number of 112 are prepolymerised with 114.98 g of 2,4-diisocyanatotoluene at 60° C. until the theoretical NCO content of 6.23 wt. % is achieved. 554.62 g of a commercially available hydrocarbon resin with an hydroxyl group content of 2 wt. % (Novares® LA 300) are then added, catalysed with 0.07 g of dibutyltin(II) dilaurate and stirred for 10 hours at 80° C. 0.15 g of benzoyl chloride is next added. After this time free isocyanate can no longer be detected in the IR spectrum. According to NCO titration the NCO content is less than 0.2 wt. %. The blocked isocyanate prepolymer obtained has the following characteristic data:

| blocked NCO content: | 2.65 wt. % |
|---|---|
| viscosity (23° C.): | 56000 mPa · s | b) Production of a Reactive System:

20 g of the prepolymer are thoroughly stirred with 6.75 g of octahydro-4.7-methanoindene-1.5-dimethanamine, 20 g of D.E.R 358, 0.4 g of oleic acid, 0.2 g of Perenol® E 8 and 0.2 g of benzyl alcohol. The mixture is poured out to form a layer 3 mm thick. After a few hours a slightly turbid, elastic plastics material having the following characteristic data is obtained:

| | |
|---|---|
| ultimate tensile stress: | 20.8 MPa |
| elongation at break: | 46.3% |
| tear propagation resistance: | 32.4 N/mm |

Example 7 a) Production of a Blocked Polyurethane Prepolymer with Acclaim® 3201:

949.13 g of the polyether polyol Acclaim® 3201 with an OH number of 37 are prepolymerised with 110 g of 2,4-diisocyanatotoluene and 0.04 g of chloropropionic acid at 60° C. until the theoretical NCO content of 2.52 wt. % is achieved. 140.18 g of iso-nonylphenol are then added, catalysed with 0.08 g of dibutyltin(II) dilaurate and stirred for 10 hours at 80° C. 0.18 g of benzoyl chloride is next added. After this time free isocyanate can no longer be detected in the IR spectrum. According to NCO titration the NCO content is less than 0.2 wt. %. The blocked isoyanate prepolymer obtained has the following characteristic data:

| | |
|---|---|
| blocked NCO content: | 2.25 wt. % |
| viscosity (23° C.): | 43100 mPa · s | b) Production of a Reactive System:

5 g of the prepolymer are thoroughly stirred with 1.52 g of octahydro-4.7-methanoindene-1.5-dimethanamine and 5 g of D.E.R 358. The mixture is poured out to form a layer 3 mm thick. After a few hours a transparent, highly elastic plastics material with a Shore A hardness of 82 is obtained:

Example 8 a) Production of a Blocked Polyurethane Prepolymer with Acclaim® 2200:

880.22 g of the polyether polyol Acclaim® 2200 with an OH number of 56 are prepolymerised with 145.5 g of 2,4-diisocyanatotoluene and 0.04 g of chloropriopionic acid at 60° C. until the theoretical NCO content of 3.24 wt. % is reached. 174.28 g of 2,6-di-tert.-butyl-4-methylphenol (Ionol) with an hydroxyl group content of 7.73 wt. % are then added, catalysed with 0.08 g of 1,8-diazabicyclo[5.4.0]undec-7-ene and stirred for 10 hours at 80° C. 0.18 g of benzoyl chloride is then added. After this time free isocyanate can no longer be detected in the IR spectrum. According to the NCO titration the NCO content is less than 0.2 wt. %. The blocked isocyanate prepolymer obtained has the following characteristic data:

| | |
|---|---|
| blocked NCO content: | 2.77 wt. % |
| viscosity (23° C.): | 117000 mPa · s | b) Production of a Reactive System:

5 g of the prepolymer are thoroughly stirred with 2.1 g of 4,4'-diaminodicyclohexylmethane, 0.05 g of 1,8-diazabicyclo[5.4.0]undec-7-ene and 5 g of D.E.R 358. The mixture is poured out to form a layer 3 mm thick. After a few hours at 40° C. a transparent, highly elastic plastics material with a Shore A hardness of 85.2 is obtained:

c) Production of a Further Reactive System:

40 g of the prepolymer are thoroughly stirred with 2.44 g of Polypox® H 031 and 1 g of 2,3-dimethyl-3,4,5,6-tetrahydropyrimidine. The mixture is poured out to form a layer 3 mm thick. After a few hours a transparent, elastic plastics material with a Shore A hardness of 85 is obtained:

Example 9

Production of Reactive Systems with Laromin® C260:

0.05 g of Perenol® E 8 and 0.05 g of 2,3-dimethyl-3,4,5,6-tetrahydropyrimidine are mixed while stirring with 10 g of each of the blocked polyurethane prepolymers produced according to Examples 1 to 8. Then in each case 0.4, 0.6 and 0.8 g of Laromin® C 260 is added while stirring, following which the reaction mixture is allowed to stand for 3 days at ambient temperature. In all cases transparent, homogeneous, thoroughly hardened and elastic plastics materials are obtained.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of blocked polyurethane prepolymers comprising reacting a) one or more diisocyanates or polyisocyanates with b) one or more polyether polyols that have a content of unsaturated terminal groups of less than or equal to 0.02 meq/g of polyol, a polydispersity (PD=$M_w/M_n$) of 1.01 to 1.5, and/or an OH functionality of greater than or equal to 1.9, which forms an NCO-functional polyurethane prepolymer, followed by blocking of the NCO groups; with c) at least one hydrocarbon resin containing phenolic OH groups and/or an optionally substituted phenol.

2. Blocked polyurethane prepolymers obtained from the process according to claim 1.

3. Blocked polyurethane prepolyniers according to claim 2, wherein the component a) is an aromatic polyisocyanate or a mixture of aromatic polyisocyanates.

4. Blocked polyurethane prepolymers according to claim 2, wherein the component b) is a polyether polyol with a polydispersity of 1.01 to 1.5 and an OH functionality of greater than 1.9.

5. Blocked polyurethane prepolymers according to claim 4, wherein the component b) has an OH functionality of greater than or equal to 1.95.

6. Blocked polyurethane prepolymers according to claim 2, wherein the component C) are hydrocarbon resins containing phenolic OH groups and with an hydroxyl group content of 0.1 wt. % to 10 wt. %.

7. Blocked polyurethane prepolymers according to claim 6, wherein the component c) are liquid hydrocarbon resins at room temperature with an hydroxyl group content of 2 wt. % to 8 wt. %.

8. A reactive system comprising:

A) polyurethane prepolymers according to claim 2,

B) at least one organic amine containing at least two primary amino groups,

C) optionally compounds containing oxirane groups that on average contain more than one oxirane group per molecule, and D) optionally catalysts and/or additives.

9. A method of making adhesives, sealing compositions, casting compositions, composites (fibre composite materials), moulded parts and coatings comprising mixing the blocked polyurethane prepolymers according to claim 2 into a solvent free reactive system.

10. A method of making anti-corrosive coatings for use in chalybeate water construction, ship building and for pipe lines comprising mixing the blocked polyurethane prepolymers according to claim 2 into a solvent free reactive system.

11. Blocked polyurethane prepolymers according to claim 3, wherein the component c) are hydrocarbon resins containing phenolic OH groups and with an hydroxyl group content of 0.1 wt. % to 10 wt. %.

12. Blocked polyurethane prepolymers according to claim 4, wherein the component c) are hydrocarbon resins containing phenolic OH groups and with an hydroxyl group content of 0.1 wt. % to 10 wt. %.

13. Blocked polyurethane prepolymers according to claim 5, wherein the component c) are hydrocarbon resins containing phenolic OH groups and with an hydroxyl group content of 0.1 wt. % to 10 wt. %.

* * * * *